United States Patent
Wu et al.

(10) Patent No.: US 10,540,358 B2
(45) Date of Patent: Jan. 21, 2020

(54) TELEMETRY DATA CONTEXTUALIZED ACROSS DATASETS

(71) Applicant: Microsoft Technology Licensing, LLC, Redmond, WA (US)

(72) Inventors: Yi-Lei Wu, Redmond, WA (US); Adam Kenneth Mihalcin, Bellevue, WA (US); Lopez Gilsinia Gilroy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 298 days.

(21) Appl. No.: 15/186,845

(22) Filed: Jun. 20, 2016

(65) Prior Publication Data

US 2017/0364561 A1    Dec. 21, 2017

(51) Int. Cl.
*G06F 7/00* (2006.01)
*G06F 16/2455* (2019.01)
*G06N 20/00* (2019.01)
*G06F 16/2457* (2019.01)

(52) U.S. Cl.
CPC .... *G06F 16/2456* (2019.01); *G06F 16/24578* (2019.01); *G06N 20/00* (2019.01)

(58) Field of Classification Search
CPC ........... G06F 17/30498; G06F 17/3053; G06F 19/707; G06F 19/24; G06F 17/153; G06F 17/15
USPC ........................................ 707/714, 726, 749
See application file for complete search history.

(56) References Cited

U.S. PATENT DOCUMENTS

| | | | | |
|---|---|---|---|---|
| 4,967,341 A | * | 10/1990 | Yamamoto | ........ G06F 17/30498 |
| 5,241,648 A | * | 8/1993 | Cheng | ................ G06F 17/30498 |
| 6,768,994 B1 | * | 7/2004 | Howard | ............... G06F 17/3087 |
| 7,757,124 B1 | * | 7/2010 | Singh | ................... G06F 11/3476 |
| | | | | 714/32 |
| 7,769,548 B2 | | 8/2010 | Garcia | |
| 8,306,931 B1 | * | 11/2012 | Bowman | ............... G06N 3/0454 |
| | | | | 706/20 |
| 8,631,048 B1 | * | 1/2014 | Davis | ................. G06F 17/30292 |
| | | | | 707/803 |

(Continued)

OTHER PUBLICATIONS

Dong, et al., "Mining Data Correlation from Multi-faceted Sensor Data in the Internet of Things", In Journal of China Communications, vol. 8, No. 1, Dec. 18, 2014, 7 pages.

(Continued)

*Primary Examiner* — Mohammed R Uddin

(57) ABSTRACT

Systems, methods, and software for telemetry event correlation is provided herein. An exemplary method includes obtaining an indication of a data selection defining at least one data entry of interest among datasets that comprise data entries determined by one or more associated telemetry elements, establishing a joined dataset based at least on contextually corresponding characteristics derived from the datasets, and processing the joined dataset with a plurality of adaptive functions to correlate data entries of the joined dataset to the data selection, with each of the plurality of adaptive functions configured to produce an associated correlation dataset comprising data entries potentially related to the data selection. The method also includes evaluating each associated correlation dataset to select an output dataset comprising contextual data entries related to the data selection.

20 Claims, 6 Drawing Sheets

(56) References Cited

U.S. PATENT DOCUMENTS

| | | | |
|---|---|---|---|
| 9,152,530 B2 | 10/2015 | Gross et al. | |
| 9,213,565 B2 | 12/2015 | Ionescu et al. | |
| 9,967,351 B2* | 5/2018 | Maheshwari | H04L 67/16 |
| 2004/0155960 A1* | 8/2004 | Wren | G07G 1/14 |
| | | | 348/150 |
| 2008/0027501 A1* | 1/2008 | Haubrich | A61N 1/37276 |
| | | | 607/34 |
| 2009/0254588 A1* | 10/2009 | Li | G06F 17/30592 |
| 2010/0191412 A1* | 7/2010 | Kim | G07C 5/008 |
| | | | 701/1 |
| 2011/0119300 A1* | 5/2011 | Marcade | G06F 17/30286 |
| | | | 707/769 |
| 2011/0225107 A1* | 9/2011 | Khosravy | G06Q 10/10 |
| | | | 706/12 |
| 2012/0101975 A1* | 4/2012 | Khosravy | G06Q 30/02 |
| | | | 706/55 |
| 2013/0232094 A1* | 9/2013 | Anderson | G05B 23/0229 |
| | | | 706/12 |
| 2014/0279707 A1* | 9/2014 | Joshua | G06Q 30/0283 |
| | | | 705/400 |
| 2014/0337429 A1 | 11/2014 | Asenjo et al. | |
| 2014/0351183 A1* | 11/2014 | Germain | G06F 17/5009 |
| | | | 706/12 |
| 2014/0372346 A1 | 12/2014 | Phillipps et al. | |
| 2015/0019714 A1 | 1/2015 | Shaashua et al. | |
| 2015/0046512 A1 | 2/2015 | Ashby et al. | |
| 2015/0254158 A1* | 9/2015 | Puri | G06F 11/3476 |
| | | | 714/37 |
| 2015/0293961 A1* | 10/2015 | Migliori | G06F 17/30336 |
| | | | 707/743 |
| 2015/0370890 A1* | 12/2015 | Halan | G06F 17/30604 |
| | | | 707/728 |
| 2016/0034525 A1* | 2/2016 | Neels | G06F 17/30389 |
| | | | 707/737 |
| 2016/0110368 A1* | 4/2016 | Mallasch | G06F 17/30569 |
| | | | 707/690 |
| 2017/0257303 A1* | 9/2017 | Boyapalle | H04L 43/14 |
| 2017/0286495 A1* | 10/2017 | Ott | G06F 17/30536 |
| 2017/0351226 A1* | 12/2017 | Bliss | G05B 13/042 |
| 2017/0364553 A1* | 12/2017 | Jacob | G06F 17/30389 |

OTHER PUBLICATIONS

Stanford-Clark, Andy, "Integrating monitoring and telemetry devices as part of enterprise information resources.", In White Paper of IBM, Mar. 2002, 14 pages.

* cited by examiner

TELEMETRY DATA CONTEXTUALIZED ACROSS DATASETS

BACKGROUND

Operational telemetry data is typically collected by monitoring elements of computing systems, software applications, operating systems, Internet of Things (IoT) devices, or other devices and systems. The telemetry data can be related to operational events of the various systems, sensor readings, software operations, operating system events, or other data which is typically accumulated into logs or databases over periods of time. The telemetry data can include data associated with disparate sources, which can span hardware, software, or other components. However, difficulty can arise when telemetry data is collected among various different sources, formats, software elements, and hardware devices, leading to unintelligible data or problems isolating failures or issues among the associated devices or software elements.

OVERVIEW

Systems, methods, and software for telemetry event correlation is provided herein. An exemplary method includes obtaining an indication of a data selection defining at least one data entry of interest among datasets that comprise data entries determined by one or more associated telemetry elements, establishing a joined dataset based at least on contextually corresponding characteristics derived from the datasets, and processing the joined dataset with a plurality of adaptive functions to correlate data entries of the joined dataset to the data selection, with each of the plurality of adaptive functions configured to produce an associated correlation dataset comprising data entries potentially related to the data selection. The method also includes evaluating each associated correlation dataset to select an output dataset comprising contextual data entries related to the data selection.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Various telemetry monitoring devices, elements, and agents can be deployed in computing systems to monitor software operation, hardware status, or other operational processes over time. These telemetry monitoring elements can record data and events related to the operational processes in various logs or databases for use by debug tools, system administrators, or end users to view past usage, determine root causes of failures, or to place issues or failures in context of other concurrent processes. In some cases, the telemetry elements can each transfer associated data to a telemetry processing platform which accumulates the data for several telemetry elements. However, typical telemetry data is included in often unique or disparate data structures which might not be related to other data, logs, or events in a direct or key-linked manner. The examples here can process data, events, and other information which is stored by various telemetry elements to determine merged or joined datasets. These datasets can be processed using various dynamically adaptive algorithms, such as search algorithms, machine learning algorithms, pattern matching algorithms, among others, to produce events or data from the various datasets which contextualize various events or data entries of interest.

Advantageously, the examples herein provide enhanced platforms and systems to dynamically join uncorrelated/disjoined client device datasets together through a combination of time-series correlation and dynamic machine learning techniques. These machine learning techniques have the ability to dynamically adjust algorithms based on different data selections and can provide enhanced insights into various datasets. Technical effects include more efficient processing of telemetry data and enhanced operation of computing and monitoring devices which not only collect such data but the systems employed to process and analyze the data according to user commands Enhanced error detection, issue isolation, debugging, and operational event contextualizing can be provided by the examples herein, reducing processor loads, storage requirements, and memory resource requirements, as well as providing for more efficient failure/problem isolation and resolution.

Figure 1:
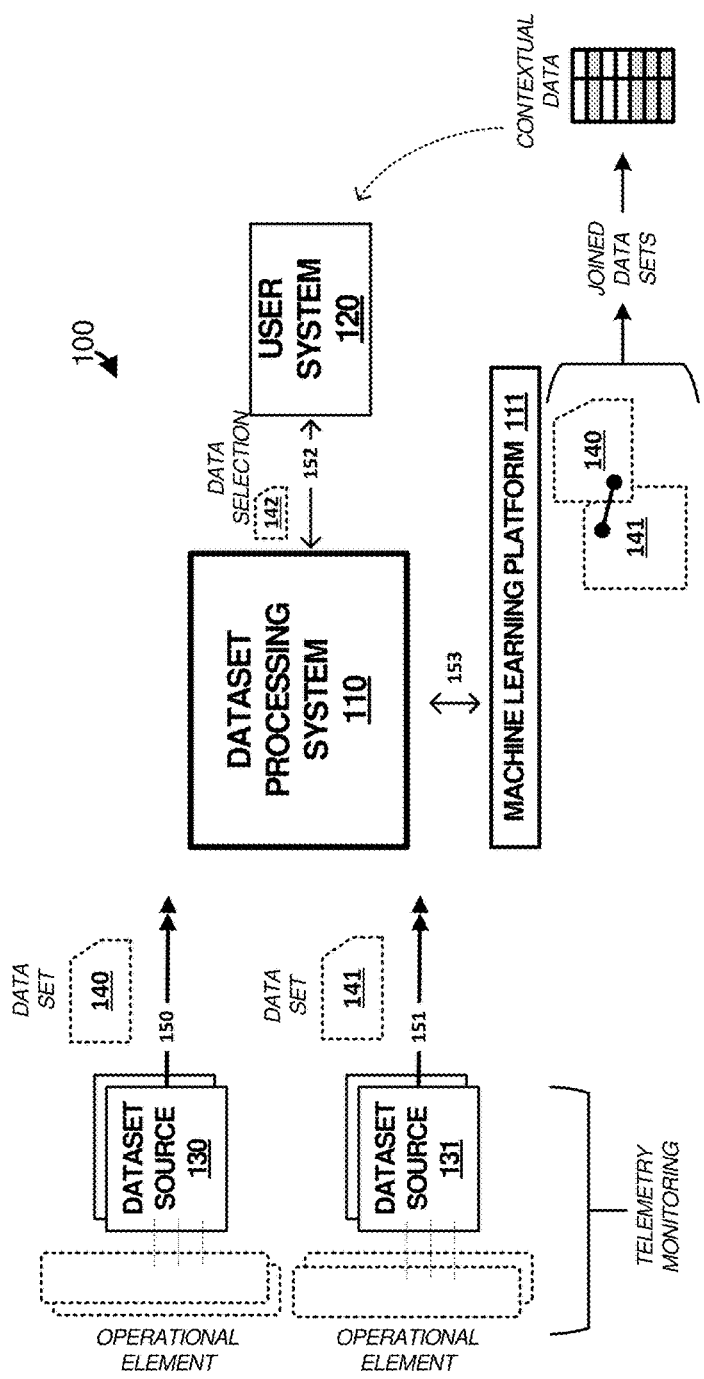
FIG. 1 illustrates a telemetry data processing environment in an example.

As a first example of telemetry event correlation, FIG. 1 is provided. FIG. 1 illustrates telemetry data processing environment 100. Environment 100 includes dataset processing system 110, machine learning platform 111, user system 120, and dataset sources 130-131. Each of the elements of FIG. 1 can communicate over one or more communication links, such as links 150-153, which can comprise network links, packet links, or other signaling interfaces. Although some links and associated networks are omitted for clarity in FIG. 1, it should be understood that the elements of environment 100 can communicate over any number of networks as well as associated physical and logical links.

In operation, dataset sources 130-131 can provide one or more datasets 140-141 to dataset processing system 110. These datasets can include telemetry data, event data, or other information that can be monitored or recorded by dataset sources 130-131 for associated software, hardware, or virtualized elements. For example, dataset sources 130-131 can include application monitoring services which provide a record or log of events associated with usage of associated applications or operating system elements. In other examples, dataset sources 130-131 can include hardware monitoring elements which provide sensor data, environmental data, user interface event data, or other information related to usage of hardware elements. These hardware elements can include computing systems, such as personal computers, server equipment, distributed computing systems, or can include discrete sensing systems, industrial or commercial equipment monitoring systems, medical sensing equipment, or other hardware elements. In further examples, dataset sources 130-131 can monitor elements of a virtualized computing environment, which can include hypervisor elements, operating system elements, virtualized hardware elements, software defined network elements, among other virtualized elements.

The datasets, once obtained by dataset processing system 110 can be analyzed to determine events of interest among the datasets and to provide contextual data and events for those events of interest. Machine learning platform 111 can be employed to process the datasets according to the desired analysis operations and dataset types employed. User system 120 can issue one or more commands to initiate analysis or to indicate data and events of interest. User system 120 can indicate data selections which might further indicate data entries of interest, data pivots, data filters, or data searches for use by system 110 and platform 111.

Figure 2:
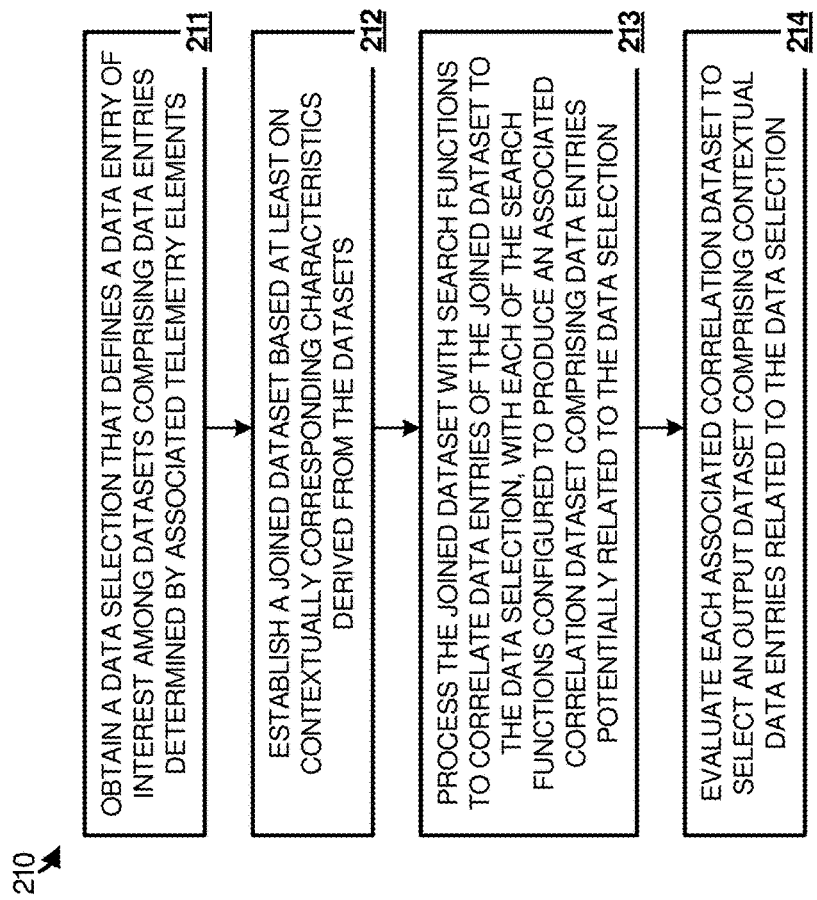
FIG. 2 illustrates a method of handling telemetry datasets in an example.

To further explore example operation of the elements of FIG. 1, flow diagram 210 is provided in FIG. 2. The operations of FIG. 2 are indicated parenthetically below. In FIG. 2, dataset processing system 110 obtains (201) a data selection that defines a data entry of interest among datasets comprising data entries determined by associated telemetry elements. In FIG. 1, data selection 142 is shown as being transferred by user system 120 for delivery to dataset processing system 110. This data selection can be employed for analysis of datasets 140-141 which are obtained by dataset processing system 110 from associated dataset sources 130-131.

As mentioned above, data selection 142 defines a data entry of interest among datasets. In some examples, user system 120 can view data entries included in datasets associated with various operational elements monitored by telemetry elements associated with dataset sources 130-131. A user can select a data entry of interest from among the datasets, such as an operational event indicated in one of the datasets which might reflect an error, failure, or other issue of interest to the user. In other examples, automated processes can monitor for specific data entries, operational events, or other indicators which might prompt selection of a data selection or data entry of interest.

Dataset processing system 110 establishes (202) a joined dataset based at least on contextually corresponding characteristics derived from the datasets. The contextually corresponding characteristics can include various properties determined from the datasets which might relate data entries of one dataset to those of another dataset. The contextually corresponding characteristics might not be data explicitly contained in the datasets and are instead derived from various properties of the datasets, such as data entry sequencing/ordering, data sources, data entry types, data formatting properties (such as columns or rows), or other properties. In many examples, the datasets or associated data entries are not related by 'key' associations or key relationships, such as logical data links or pointers which explicitly link data entries among two or more of the datasets. In some examples, the contextually corresponding characteristics comprise time correlations. In other examples, the contextually corresponding characteristics can comprise a data source type, such as similar applications, software elements or processes, similar hardware platforms, or similar virtualized elements, among other characteristics derived from the data. A sequence or ordering of the data entries of the datasets can be determined and related to each other, which can be further related to a time of occurrence or recordation of the associated data entries. Machine learning platform 111 might be employed to determine the contextually corresponding characteristics. Machine learning platform 111 can perform pattern recognition and matching of the various datasets to align sequences of data entries of various datasets to each other.

In some examples, the contextually corresponding characteristics can include time characteristics of the datasets. The joined dataset can be determined based at least on the time correlation among the datasets, the time correlation including a timeframe associated with the data selection. The time correlation can be determined by data entries included in the datasets, such as timestamps or other time indicators. However, in many examples timestamps are not included or timestamps to not match among datasets. Thus, dataset processing system 110 can determine the time correlations among different datasets, such as among dataset 140 and 141, to produce a joined dataset. A sub-portion of the total data entries of a dataset can be included in the joined dataset, such as a portion of the data entries of each dataset within a predetermined window of time. This window of time typically would include a time or timeframe associated with the data selection or associated data entry of interest. Machine learning platform 111 might be employed to perform the time correlation of datasets to produce a joined dataset, or other elements of dataset processing system 110 can instead be employed. Dataset processing system 110 and machine learning platform 111 can perform the time correlation using the aforementioned timestamps or time information and can infer relationships in time between data entries of the datasets based at least on associated time information for the data entries. Data entries can be related in time even if not occurring simultaneously or at a same timestamp. For examples, data entries that occur within a predetermined timeframe defined in seconds or milliseconds can be considered to be related to each other.

Once a joined dataset is produced by dataset processing system 110, then further dataset analysis can be employed for the joined dataset. This further processing includes finding contextual events or contextual data entries for the data selection or associated data entry. Specifically, dataset processing system 110 processes (203) the joined dataset with adaptive functions to correlate data entries of the joined dataset to the data selection, with each of the adaptive functions configured to produce an associated correlation dataset comprising data entries potentially related to the data selection. These adaptive functions can include various machine learning algorithms, which provide pattern discovery and matching processes to determine candidate data entries among the joined dataset which the associated adaptive function determines as relevant or related to a particular data selection. Each adaptive function produces an associated correlation dataset which includes a plurality of data entries that contextualize the data selection or data entry of interest among the other data entries of the joined dataset. Since the joined dataset is typically formed from several datasets of various dataset sources, then cross-dataset contextualizing of the data selection can be produced.

However, ones of the correlation datasets can be better at producing a useful context of other events for the data selection. Dataset processing system 110 evaluates (204) each associated correlation dataset to select an output dataset comprising contextual data entries related to the data selection. Dataset processing system 110 provides a ranking or selection process which produces at least one correlation dataset which is employed as the output dataset. Further discussion on the selection of the output dataset is included below for FIGS. 3-6. This output dataset can then be used for determination of issues or problems associated with the data selection or data entry of interest indicated by a user. The output dataset can be provided to user system 120 for further analysis and troubleshooting to isolate failures, problems, or other issues occurring for the operational elements monitored by telemetry systems.

Referring back to the elements of FIG. 1, dataset processing system 110 comprises computer processing systems and equipment which can include communication or network interfaces, as well as computer systems, microprocessors, circuitry, distributed computing systems, cloud-based systems, or some other processing devices or software systems, and which can be distributed among multiple processing devices. Examples of dataset processing system 110 can also include software such as an operating system, logs, databases, utilities, drivers, networking software, and other software stored on a computer-readable medium. Dataset processing system 110 can provide one or more communication interface elements which can receive datasets from telemetry elements, such as from dataset sources 130-131. Dataset processing system 110 also provides one or more user interfaces, such as application programming interfaces (APIs), for communication with user devices to receive data selections and provide dataset results to user devices.

Machine learning platform 111 comprises various dataset processing modules which provide machine learning-based data processing, analysis, and performance persistence. In some examples, machine learning platform 111 is included in dataset processing system 110, although elements of machine learning platform 111 can be distributed across several computing systems or devices, which can include virtualized and physical devices or systems. Machine learning platform 111 includes algorithm repository elements which maintain a plurality of data processing algorithms Machine learning platform 111 also include various models for evaluation of the algorithms to determine output performance across past datasets, supervised training datasets, and other test/simulation datasets. A further discussion of machine learning examples is provided below.

User system 120 comprises network interface circuitry, processing circuitry, and user interface elements. User system 120 can also include user interface systems, network interface card equipment, memory devices, non-transitory computer-readable storage mediums, software, processing circuitry, or some other communication components. User system 120 can be a computer, wireless communication device, customer equipment, access terminal, smartphone, tablet computer, mobile Internet appliance, wireless network interface device, media player, game console, or some other user computing apparatus, including combinations thereof.

Dataset sources 130-131 comprise computer-readable storage elements which store telemetry data monitored for various operational elements. The telemetry elements can include monitoring portions composed of hardware, software, or virtualized elements that monitor operational events and related data. Dataset sources 130-131 can include application monitoring services which provide a record or log of events associated with usage of associated applications or operating system elements. In other examples, dataset sources 130-131 can include hardware monitoring elements which provide sensor data, environmental data, user interface event data, or other information related to usage of hardware elements. In further examples, each dataset source 130-131 can be associated with Internet of Things (IoT) elements that include network-coupled entities which enable network communication and telemetry monitoring for various end-user devices, components, and objects.

Communication links 150-153 each use metal, glass, optical, air, space, or some other material as the transport media. Communication links 150-153 each can use various communication protocols, such as Internet Protocol (IP), transmission control protocol (TCP), Ethernet, Hypertext Transfer Protocol (HTTP), synchronous optical networking (SONET), Time Division Multiplex (TDM), asynchronous transfer mode (ATM), hybrid fiber-coax (HFC), circuit-switched, communication signaling, wireless communications, or some other communication format, including combinations, improvements, or variations thereof. Communication links 150-153 each can be a direct link or may include intermediate networks, systems, or devices, and can include a logical network link transported over multiple physical links. In some examples, links 150-153 comprise wireless links that use the air or space as the transport media.

Figure 3:
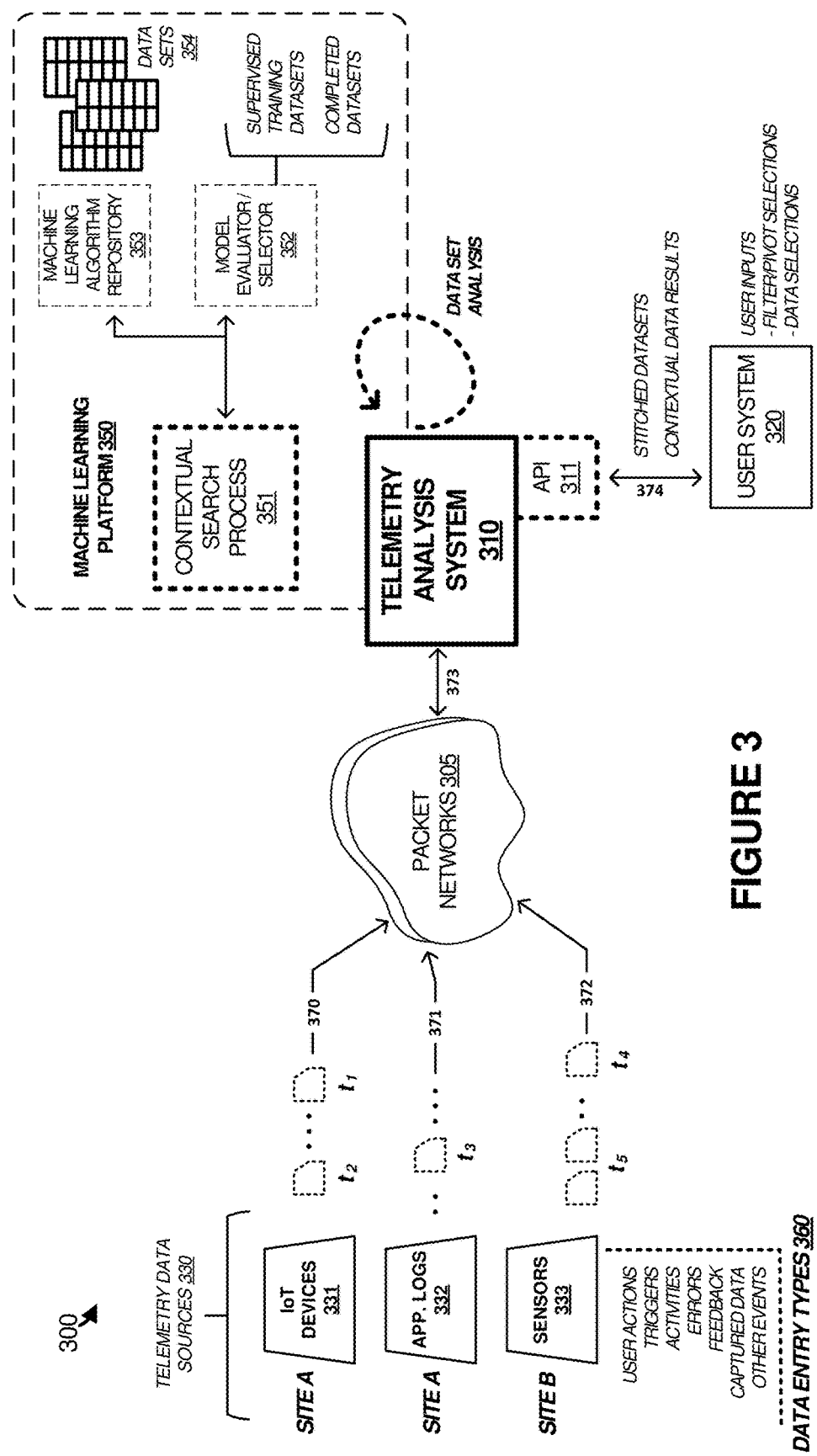
FIG. 3 illustrates a telemetry data processing environment in an example.

FIG. 3 illustrates further implementations of dataset processing and analysis systems, as exemplified by the elements of telemetry data processing environment 300. Telemetry data processing environment 300 includes telemetry analysis system 310, user system 320, and telemetry data sources 330. Each of the elements of environment 300 can communicate over one or more packet networks, such as shown for packet network 305. Packet links 370-374 each comprise one or more packet links, such as TCP/IP links for carrying various traffic among the associated elements of environment 300.

Telemetry analysis system 310 has further detail shown in FIG. 3 for an example implementation. Specifically, system 310 includes machine learning platform 350 which further comprises contextual search process 351, model evaluator/selector 352, and machine learning algorithm repository 353. Various datasets 354 can also be maintained by platform 350, and these datasets can include current datasets, old/past datasets, supervised training datasets, completed datasets, or sample datasets, among others.

The elements of system 310 or platform 350 can be executed by one or more computing elements, such as servers, computers, or virtualized computing elements. Furthermore, the elements of system 310 or platform 350 can be distributed over more than one computing element, which might include execution over a cloud-based processing and storage platform or other distributed computing systems. Associated data storage elements can be included in system 310 for storing datasets, executable instructions, and other related data. These data storage elements can include non-transitory computer-readable storage devices and elements, and can be distributed over a geographic area.

System 310 provides an API 311 for one or more end user devices to interact with system 310. In FIG. 3, user system 320 is shown communicating with API 311 over link 374, although it should be understood than any number of user systems can communicate with system 310 over associated communication interfaces, networks, and links. In FIG. 3, API 311 is shown receiving user inputs that include data selections, data pivots, search or filter parameters, timeframes of interest, data entries of interest, correlation directions, correlation ranges, algorithm selections, or even datasets provided by user system 320. API 311 can deliver information to user system 320, such as merged datasets, joined datasets, contextual dataset results, output datasets, and other data. Furthermore, API 311 can provide one or more user interface elements by which user system 320 can interact with the features and elements of system 310, such as web-based interfaces, text/terminal interfaces, command-line interfaces, windowed interfaces, terminal interfaces, function-call interfaces, or other interfaces, including combinations thereof.

In operation, telemetry analysis system 310 can receive datasets that are provided by any number of data sources, such as the various telemetry data sources 330 shown in FIG. 3. Telemetry analysis system 310 can receive IoT data over link 370 and packet networks 305 that are transferred by one or more IoT devices 331 at a first location, site A. Telemetry analysis system 310 can receive application log data over link 371 and packet networks 305 that are transferred by one or more application logging devices 332 at a first location, site A. Telemetry analysis system 310 can receive sensor data over link 372 and packet networks 305 that are transferred by one or more sensor devices 333 at a second location, site B. Further locations and telemetry devices can be included, and the three pictured in FIG. 3 are merely exemplary of a plurality of telemetry data sources that each produce datasets.

As seen in FIG. 3, each telemetry data source might provide data or datasets in a different pattern or timewise distribution, and each might have different timing properties for the associated data entries, such as a frequency of logging entries, number of data samples per dataset, or operational event granularity. Under the constraints of associated telemetry resources, the datasets and associated data entries might be partial, incomplete, delayed, or fragmented. Many times a key association cannot be used to join data entries among these different datasets.

For example, IoT devices 331 might provide datasets in a 'bursty' time-spaced manner upon occasional power-on or in response to events monitored by the IoT devices. This data might be asynchronous in nature and dependent upon power/battery status of the associated devices, and can be communicated using "delay tolerant network" styles of protocols and devices. Likewise, application log elements 332 might provide datasets upon request or in response to errors or flagged events, and might include a larger amount of accumulated data than IoT devices. Finally, sensors 333 might provide data or datasets in a streaming or continual basis, such as when real-time monitoring is desired. Other configurations of data transfer and datasets can be included. However, the processing techniques discussed herein can advantageously handle data sources which produce datasets that vary in formatting, style, type, duration, and transfer frequency, among other differences.

The datasets discussed for the operations and elements of FIG. 3 (or for any of the examples herein) can comprise one or more data entries. These data entries can be formatted into tables, chronological logs, sequential logs, processing thread-based logs, linked lists, databases, spreadsheets, text/lists, or other data formats, including combinations thereof. These data entries can comprise operational events that are monitored and captured for associated operational elements. The data entries can comprise those shown in FIG. 3 for data entry types 360, such as user actions, triggers, activities, errors, feedback, captured data, or other events. Each data entry can comprise a data record with one or more data fields. These data fields can include information identifying the data entry, timestamps or timing information, process/thread identifiers associated with the data entry, device identifiers, location identifiers, network addresses/identifiers, user identities, user action summaries or information, sensor data, or other information listed in FIG. 3 for data entry types 360, including combinations and variations thereof.

As mentioned above, these datasets can include data entries for captured data, operational event data, or other information that can be monitored or recorded by telemetry data sources 330 for associated software, hardware, or virtualized elements. For example, application logging elements 332 can include application monitoring services which provide a record or log of events associated with usage of associated software applications, operating system elements, or communication/network elements. Application logging elements 332 can monitor operational events and user-induced events of productivity applications, graphical user interfaces systems, operating system kernel events and activity, network endpoint activity, network socket events, or other software and network events. Application logging elements 332 can monitor elements of a virtualized computing environment, which can include hypervisor elements, operating system elements, virtualized hardware elements, software defined network elements, among other virtualized elements. In other examples, sensors 333 can include hardware monitoring elements which provide sensor data, environmental data, user interface event data, or other information related to usage of hardware elements. These hardware elements can include computing systems, such as personal computers, server equipment, distributed computing systems, or can include discrete sensing systems, industrial or commercial equipment monitoring systems, medical sensing equipment, or other hardware elements.

In further examples, IoT devices 331 can have network-enabled and environment-aware elements embedded into various objects or physical elements to provide digital data or associated datasets indicative of current states or properties of the objects or physical elements. IoT devices 331 typically comprise devices that collect data and provide that data for monitoring/analysis of the associated devices. These devices can include automotive devices, autopilot data, home automation devices, energy monitoring devices, smart-home devices, or other devices with embedded processors and sensors.

Advantageously, the examples herein provide dynamic data filtering/searching and joining of datasets. Various time-based correlation and machine learning algorithms are employed to dynamically join and contextualize such data and enable users to perform better analysis and insight into the data. Technical effects include more efficient processing of telemetry data and enhanced operation of the computing and monitoring devices which not only collect such data but the systems employed to process and analyze the data according to user commands Enhanced error detection, issue isolation, and operational event contextualizing can be provided by the examples herein, reducing processor loads, storage requirements, and memory resource requirements.

Figure 4:
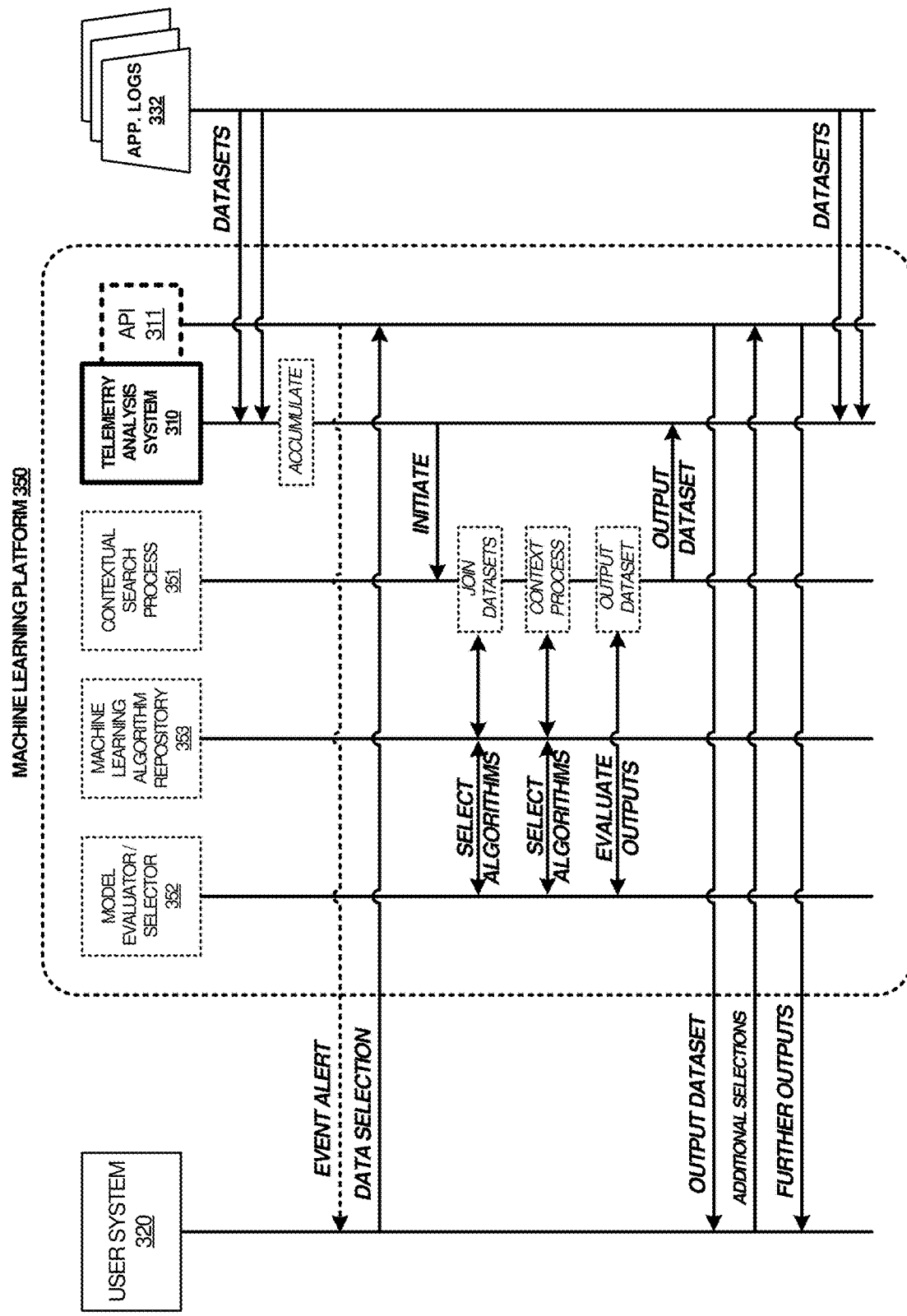
FIG. 4 illustrates a method of handling telemetry datasets in an example.

A further discussion of the elements of environment 300 is provided in FIG. 4. FIG. 4 illustrates a method of handling telemetry datasets in an example. In FIG. 4, dataset sources, such as application log system 332 transfers various datasets for delivery to telemetry analysis system 310. These datasets can comprise any data records that indicate data fields collected over time or for a sequence of operational events. For example, application log system 332 might transfer event logs comprising time-wise operational events corresponding to events and telemetry data for monitored software systems (e.g. application events, operating systems, kernel operation, storage system operations, and the like). Other datasets as discussed herein can also be employed.

Once received, telemetry analysis system 310 can accumulate these datasets in a storage system for usage by operators, end users, or by automated event handling processes. For example, certain events among the datasets might indicate failures, alerts, or operational events of interest. Responsive to seeing one or more of these types of events in the datasets, telemetry analysis system 310 can provide an alert informing user system 320 or other operator system of the particular event encountered. In other examples, a user might desire to perform analysis on accumulated datasets for troubleshooting, diagnosis, or debugging.

User system 320 can issue one or more data selections for delivery to telemetry analysis system 310. User system 320 can issue one or more noted events of interest to telemetry analysis system 310. The noted events of interest can be included in the data selection, or vice versa. In some examples, a noted event comprises the data selection. In this manner, a user can identify identities or properties of issues or events of interest, and these identities or properties can be used by machine learning platform 350 to 'match' patterns and produce possible output datasets that comprise potentially contextual data entries. Advantageously, troubleshooting problems in hardware, software, or virtualized elements can be enhanced and made more efficient. Moreover, technical effects such as reduced processing time to debug computer/software issues, enhanced 'bug' detection and isolation of computing systems, and faster parsing through voluminous logs and datasets are all provided by the examples herein.

Responsive to the data selection or data entry or event of interest, telemetry analysis system 310 initiates a process to join/merge relevant datasets and produce a contextualized dataset surrounding the data selection or event of interest. To initiate this process, telemetry analysis system 310 can provide the datasets along with the data selection or event of interest to contextual search process 351. This process 351 first joins one or more datasets into a single joined dataset. The relevant datasets can be indicated by telemetry analysis system 310, by a user with the data selection, or determined based on an event of interest that is included in a particular dataset. Typically, the data entries of different datasets are not related by explicit logical associations, such as key associations. This lack of explicit key associations can make correlating data entries or data records among different datasets more complex. However, if any key associations are found, these can be used in the join processes.

When key associations are not found or used, the join process can include establishing a joined dataset based at least on contextually corresponding characteristics derived from the datasets. Furthermore, machine learning algorithms can also be employed to learn and recognize patterns among the datasets that can be used to join/merge the datasets together and indicate individual events of the datasets as concurrent, coincident, or related. The contextually corresponding characteristics are derived from the datasets themselves, and can include determining common properties among the datasets, such as similar columns or data fields, or sequences among the datasets or among events/fields within the datasets. Data fields or data columns might be inferred by the contextual search process, such as when a particular data field or data property associated with data entries of the datasets can be determined to correspond to other data or properties not included in the dataset. For example, when operational events of software applications are included in the datasets, a particular dataset might not include names or identifiers of the actual software applications. Machine learning platform 350 can deduce the application name/identifier based on properties of the included data among the datasets, and these deduced items can be used to join datasets. In another example, one dataset might include application event log data, and another dataset might include operating system or kernel event logs. A name of the application might be derived from contextually corresponding characteristics of the kernel event logs, such as based on a process identifier, thread identifier, memory space/address usage, communication properties, associated network addressing, or other properties. Once the application name is derived from the kernel event logs, then portions of the kernel event logs might be joined to the application event logs which include names of the applications. Other joins based on contextually corresponding characteristics can be performed.

Time correlation can comprise a contextually corresponding characteristic, and can be used to join datasets. Machine learning platform 350 can establish time correlations among the datasets by at least determining time properties associated with the data entries of the datasets, and forming the joined dataset by merging portions of the datasets having corresponding time properties. The time correlations might not be exact in nature, such as matching timestamps or time properties exactly. Instead, a flexible time correlation can be employed which establishes a predetermined window of time, such as an number of seconds, for each event in a first dataset and then correlates events from a second dataset which occur within the predetermined window of time for each event of the first dataset. Typically, any time correlations performed will include a time or timeframe associated with the noted event of interest, data selection, or other specified timeframes.

Once a time correlated join or other join has been performed to join at least part of two or more datasets, or to join portions of a single dataset to other portions of that same dataset, a contextualization process is performed by machine learning platform 350. Specifically, machine learning platform 350 executes a plurality of adaptive processes or functions on the joined dataset. These adaptive processes can comprise a plurality of machine learning algorithms that are available from repository 353 and used to correlate the joined data to a noted event or based on the data selection. Each machine learning algorithm employed will produce an associated correlation result that has events that are determined to be potentially related or correlated to the event of note or the data selection specified. However, some of the correlation results or correlation datasets might be more relevant to the data selection or noted event than others, and a selection process can be employed to select an appropriate output result. Stated another way, for each of the plurality of adaptive functions, the joined dataset is processed with one or more machine learning algorithms to determine correlations of data entries in the joined dataset to the at least one data entry of interest and produce the associated correlation dataset. Each of the plurality of machine learning algorithms determine potential events among the joined dataset that are evaluated by the associated adaptive function to correspond to a context of the first noted event. For an example noted event, the plurality of machine learning algorithms can correlate the noted event to a target issue associated with a monitored element among the one or more telemetry elements, such as by identifying a pattern of operational events that indicate the target issue among the joined dataset.

Machine learning algorithm repository 353 comprises one or more storage systems or storage elements which contain both algorithmic representations of dynamically adaptive functions as well as test data or simulation datasets which can be used to train or refine operation of the machine learning algorithms. Machine learning platform 350 stores a list of models that exhibited performance above a desired threshold for particular datasets or types of datasets. For example, a dataset might comprise operational events or instead might comprise logged sensor data. Each dataset might have different properties, fields, records, and other characteristics which distinguish each dataset from another type of dataset. Some of the machine learning algorithms can also perform better on certain types of datasets than on others. Preprocessing can be performed on past datasets or simulation datasets of various types to established which dataset types are best suited to a particular machine learning algorithm or set of machine learning algorithms.

Model evaluator/selector 352 can be employed to select one or more of the machine learning algorithms to use in joining datasets, determining correlation datasets, or for other uses. Model evaluator/selector 352 can test each machine learning algorithm using modeling or simulated datasets as well as actual datasets from past analyses to evaluate performance of each of the machine learning algorithms. Supervised training scenarios as well as automated training scenarios can be applied to evaluate performance of the machine learning algorithms for each type of dataset. Supervised training datasets can include evolving datasets that prefer user input for training and evaluation of the performance of the machine learning models and algorithms. Test datasets can consist of datasets used to build machine learning models and algorithms for merging/joining datasets together. Each model performance result can contain performance of the associated model used, and can be stored in machine learning algorithm repository 353 to optimize and inform future user queries. Additionally, data morphing capabilities can be added to deduce derived datasets to improve model performance.

Once sufficient model/algorithm training has been performed, then model evaluator/selector 352 can select the best model or machine learning algorithms to use which produce correlation datasets suitable for output to a user as an output dataset. Model evaluator/selector 352 selects ones of the plurality of adaptive functions to process the joined dataset based on at least one selection factor comprising properties of data indicated by the data selection, properties of the data entries determined by the one or more associated telemetry elements, and indications of performance of the plurality of adaptive functions with regards to further datasets that share characteristics with the datasets. These selection factors can be evaluated to establish which of the correlation datasets produce the 'best' result for a given joined dataset. As noted above, properties of the joined dataset can include data types included in the joined dataset, dataset types used to form the joined dataset, or other properties related to both structural properties and properties of the intrinsic data contained in the datasets. The indications of performance of the plurality of adaptive functions with regards to further datasets that share characteristics with the datasets can include simulated performance/modeling, performance with regards to test or sample datasets, or performance with regards to past dataset analysis, among other indications. Model evaluator/selector 352 evaluates each associated correlation dataset to select an output dataset to provide to a user or operator based at least on a ranking of these performance indicators associated with the one or more machine learning algorithms. This evaluation can include indications of how the one or more machine learning algorithms have processed past datasets of a similar type as one or more of the datasets.

The ranking can include various indications of performance of the correlation dataset with regards to the noted event of interest or data selection. For example, a ranking might be performed based on a scoring of the correlation datasets that indicates correlation datasets with the most data entries that are related or correlated to the noted event of interest. Another example ranking might include performance indicators of how closely each of the machine learning algorithms perform as compared to model/simulated performance datasets. Multiple layers of ranking can be employed. Furthermore, process/algorithm feedback can be determined by telemetry analysis system 310 in response to user activities regarding the user queries and results. Specifically, a ranking level associated with errors that users select from a user interface, such in an output dataset, can indicate how well relevance scoring is working using the various machine learning algorithms. User selection information from the output datasets or associated reports can be fed back into the selection models, and techniques such as Learning to Rank (LETOR) can be employed to improve relevance based on user selection patterns for previously shown results.

In one example user query vignette, a user can be presented with a graphical or textual user interface by telemetry analysis system 310, such as over API 311. The user can view datasets, events, logs, databases, or other data accumulated by system 310. The user interface might present suggested data entries or events of interest, and the user might select a desired event of interest to query from among the various presented data. For example, in a word processing application event log, an error might be encountered and logged, such as a crash or operational violation. The event indicating the error can be presented to a user, and the user can select this event as well as one or more filtering selections which indicate a preferred view of contextual data for that selected event. Telemetry analysis system 310 in conjunction with machine learning platform 350 can perform the analysis described herein to produce contextual events that are related to the selected event, such as user interactions (mouse clicks, keypresses, and the like), other system operations such as kernel events, network activity, other application activities, or other contextual events. These events can be automatically and intelligently extracted by telemetry analysis system 310 from many different types of datasets from many different sources.

Figure 5:
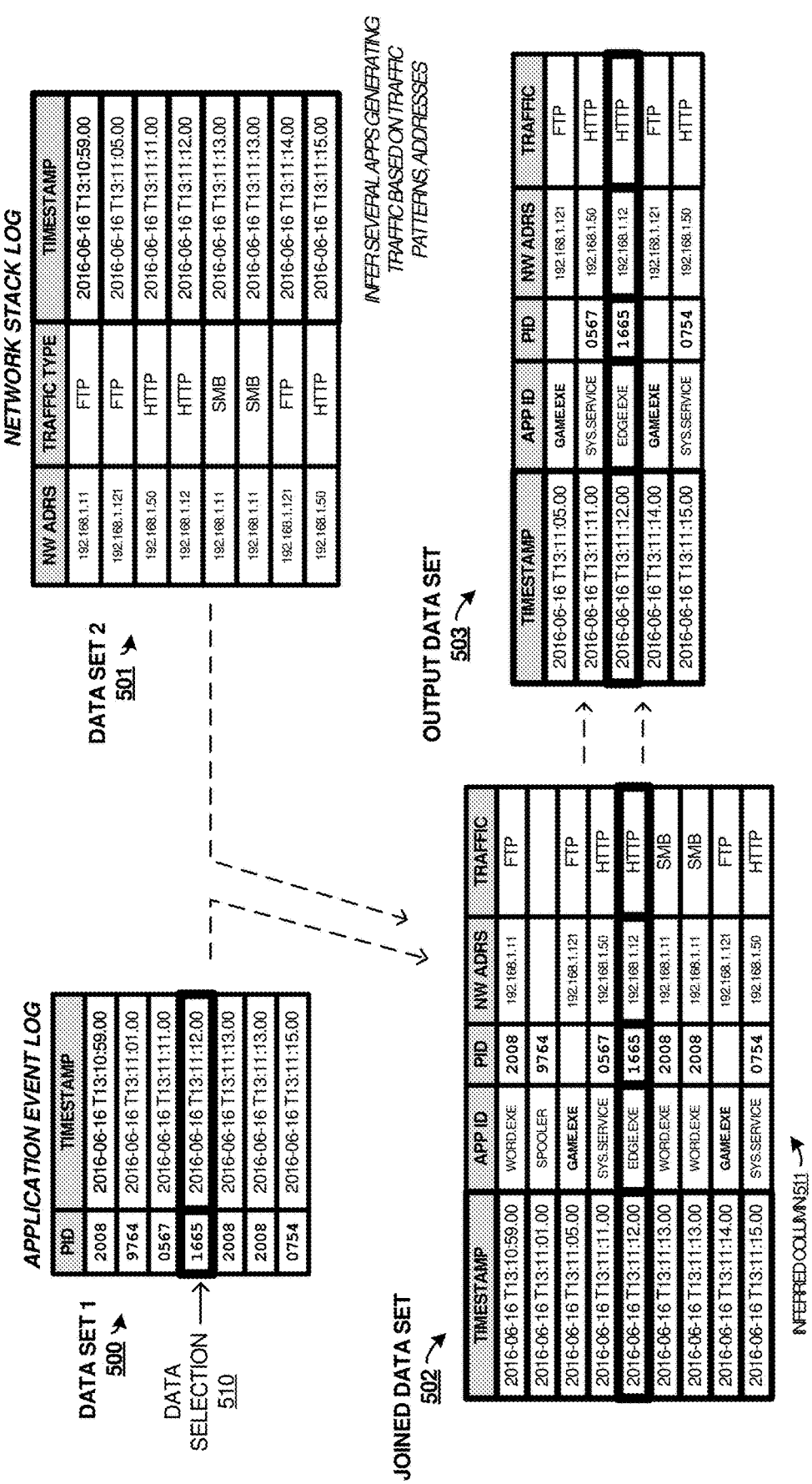
FIG. 5 illustrates example telemetry data in an example.

Another example user query example is indicated in FIG. 5. FIG. 5 illustrates two source datasets, namely dataset 500 and dataset 501. Each dataset can be of a different type and include events, log data, or activity data for different types of elements. For example, dataset 500 comprises an application event log for a computing system, with columns that indicate application process/thread identifiers (PID) and timestamps. Likewise, dataset 501 comprises a network stack log for that computing system, with columns that indicate a network address associated with the network event, a traffic type associated with the network address, and timestamps. Example PIDs, network addresses, timestamps and network traffic, such as the indicated file transfer protocol (FTP), hypertext transfer protocol (HTTP), and server message block traffic (SMB), are merely exemplary.

A data selection 501 is specified by a user, such as in a query or other user interaction. Based on these two datasets and the data selection, a join process is employed to join both datasets into a joined dataset. In this example, a timestamp can be used to sequentially arrange entries of each dataset into the joined dataset. However, several characteristics can be derived from the datasets in addition to sequencing and time correlations. In dataset 500, an application name can be inferred or derived based on a process identifier (PID) or other factors, and this inferred information is included in column 511. In dataset 501, several different applications can be inferred as communicating via different network addresses or based on associated traffic patterns indicated by the timestamps or other properties.

Joined data set 502 can then be processed by one or more machine learning algorithms, such as search functions or correlation functions, to produce output dataset 503. When multiple machine learning algorithms are employed, multiple output datasets can be produced and selected among by a further selection process. This selection process is omitted in FIG. 5 for clarity. Output dataset 503 might have a reduced number of entries which are determined to correspond to the event of interest indicated by the data selection. Output dataset 503 can be used to determine sequencing information for applications and network traffic that surround the event of interest. This surrounding or contextual information can allow a user to isolate and debug a problem associated with the event of interest.

Returning to the discussion of FIG. 4, some examples of the machine learning algorithms of machine learning platform 350 include search functions or search engine techniques. A search function can perform a search among the datasets for events which might be related to an event noted in a query by a user. For a given an event/activity A, a user might want to rank all errors ($E_1$, $E_2$, $E_3$, . . . , $E_n$) or events such that true relevance ($R_{true}$) follows $R_{true}$ ($E_1$, A)$\geq R_{true}$ ($E_2$, A)$\geq$ . . . $\geq R_{true}$ ($E_n$, A). In most examples, true relevance might not be achievable, so an estimated relevance ($R_{est}$) can be determined. $R_{est}$ (E, A) should be large when E occurs frequently in conjunction with failures of A. $R_{est}$ (E, A) should be small when E occurs frequently in conjunction with activities$\neq$A, or with successes of A.

The machine learning algorithm might be selected as a term frequency-inverse document frequency (tf-idf) function which can indicate how important a selected event or data entry is among a set of data entries or events. If telemetry analysis system 310 treats each activity as a word, and each error as a document, search engine techniques can be employed to produce a relevance metric for documents and words that meet the same properties as $R_{est}$. A tf-idf metric for document D and word W, where D is the set of all documents, might be implemented as:

$$tf\text{-}idf(d, w) = \text{Count}(w \in d) * \log\left(\frac{|D|}{|d' \in D \text{ such that } w \in d'|}\right).$$

The first term above indicates the tf, and the second term indicates the idf. This configuration can work in search engine techniques as a starting point, but issues can arise which are different than typical search engines encounter. For example, the idf term above might be the same for every single error that can be compared to an activity. This issue is not typically encountered in most search engines, where searches are typically multi-word, but in this example the process is attempting to find the top errors for a single activity.

Another approach can use the term frequency of the activity, and the inverse "activity frequency" of the error, in part because the numerator and denominator are defined in terms of activity-error tuples. The formula above then becomes:

$$R_{est}(E, A) = \text{Count}(A \text{ fails where } E \text{ occurs}) *$$
$$\log\left(\frac{|\text{distinct activity} - \text{error tuples, including successes}|}{|\text{distinct activity} - E \text{ tuples, including successes}|}\right).$$

Notice that this further formula assumes some notion of co-occurrence between activities and errors, and bases metrics on the correlated activity-error tuples.

Notions of co-occurrence can also be employed by machine learning platform 350. These notions of co-occurrence can include by process (such as a user process or application process), and by process plus approximate time. The notion of correlation by process comprises determining that an activity instance group and error instance group co-occur if they occur within the same process. Correlation by process plus approximate time comprises determining that an activity instance group and error instance group co-occur if they occur within the same process, and the timestamp on the event is in the same minute. In this example, the timestamp for an activity is the mean of start and end time, and the timestamp for errors can be a single column in a rule result. Typically, co-occurrence by process can produce significantly more data output than co-occurrence by process plus approximate time, in part because an activity and error co-occur by process if also co-occurring by process plus approximate time. In some examples, activity failures and errors that co-occur a small number of times might get scored higher than desired. Filters can be applied to produce only those activities that co-occur with errors a predetermined number of times, regardless of the number of activity instances (i.e. tf) involved.

Figure 6:
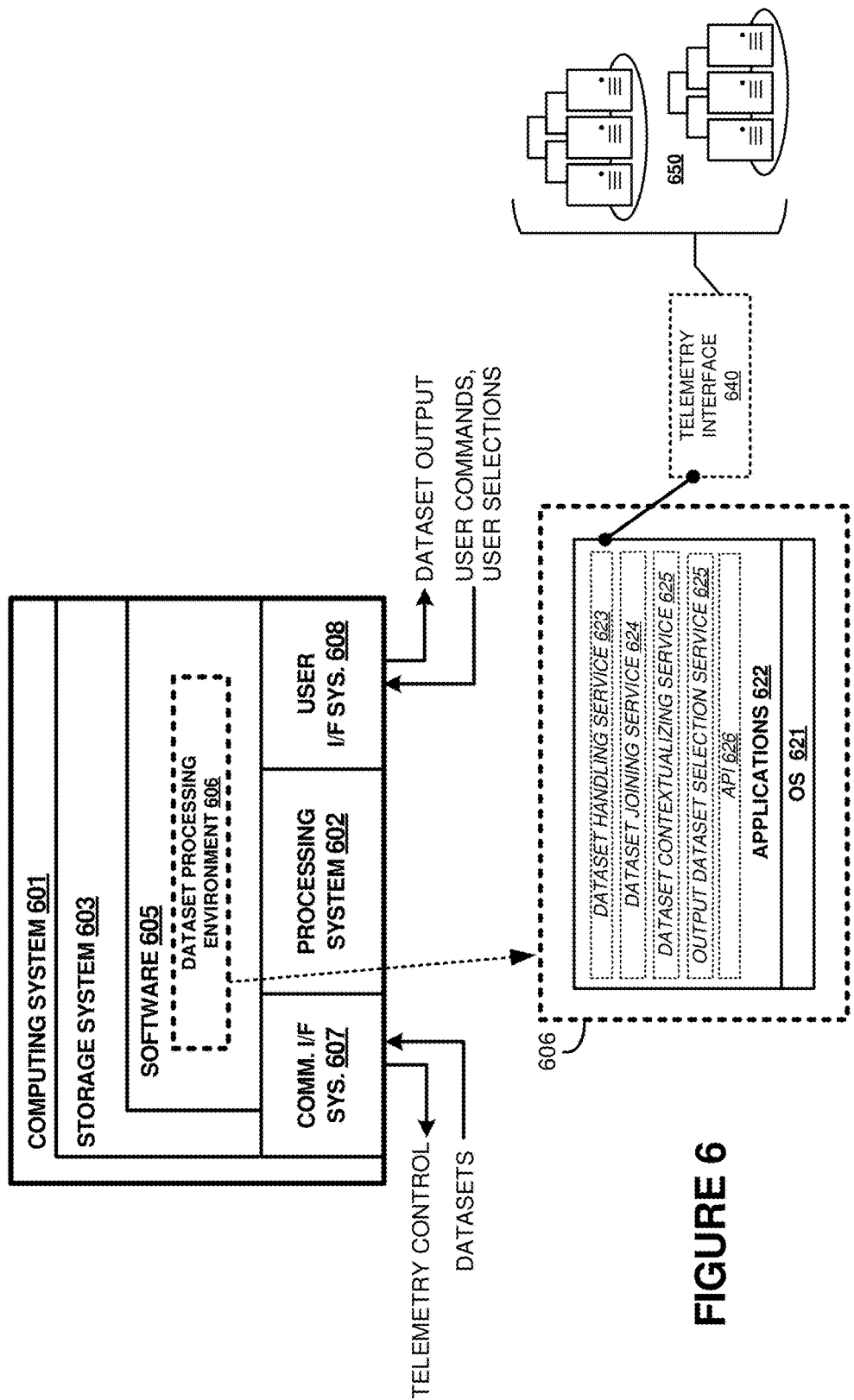
FIG. 6 illustrates a computing system suitable for implementing any of the architectures, processes, and operational scenarios disclosed herein.

Turning now to FIG. 6, computing system 601 is presented. Computing system 601 that is representative of any system or collection of systems in which the various operational architectures, scenarios, and processes disclosed herein may be implemented. For example, computing system 601 can be used to implement any of dataset processing system 110 or machine learning platform 111 of FIG. 1, and telemetry analysis system 310 or machine learning platform 350 of FIG. 3. Examples of computing system 601 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 608. Processing system 602 is operatively coupled with storage system 603, communication interface system 607, and user interface system 608.

Processing system 602 loads and executes software 605 from storage system 603. Software 605 includes dataset processing environment 606, which is representative of the processes discussed with respect to the preceding Figures.

When executed by processing system 602 to enhance dataset processing and data selection contextualization, software 605 directs processing system 602 to operate as described herein for at least the various processes, operational scenarios, and environments discussed in the foregoing implementations. Computing system 601 may optionally include additional devices, features, or functionality not discussed for purposes of brevity.

Referring still to FIG. 6, processing system 602 may comprise a microprocessor and processing circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, resistive memory, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing the dataset processing environments and platforms discussed herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software or other application software, in addition to or that include dataset processing environment 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to facilitate enhanced dataset processing and computer system issue isolation. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Dataset processing environment 606 includes one or more software elements, such as OS 621 and applications 622. These elements can describe various portions of computing system 601 with which users, dataset sources, telemetry elements, machine learning environments, or other elements, interact. For example, OS 621 can provide a software platform on which application 622 is executed and allows for receipt of datasets from telemetry sources, processing of the telemetry sources according to one or more machine learning algorithms, and isolation/contextualizing of various data selections or data entries of interest.

In one example, dataset handling service 623 can receive datasets from telemetry elements or other dataset sources, store various datasets for processing in storage system 603, and transfer output datasets to users or operators. In FIG. 6, telemetry interface 640 can be provided which communicates with various telemetry devices or dataset sources (650). Portions of telemetry interface can be included in elements of communication interface 607, such as in network interface elements. Dataset joining service 624 can process datasets received from different sources and join these datasets according to various correlations or derived characteristics, such as time correlation or inferred columns or data entries. Dataset contextualizing service 624 processes a data selection or data entry of interest indicated by a user or operator to determine a set of data entries that contextualize the selection/entry of interest. Output dataset selection service 625 can select among various potential output datasets as determined by dataset contextualizing service 625. Various machine learning algorithms can be employed in services 624-626. These machine learning algorithms can be employed in computing system 601 or computing system 601 can communicate with other computing systems that house the various machine learning algorithms API 626 provides user interface elements for interaction and communication with a user or operator, such as through user interface system 608. API 626 can comprise one or more routines, protocols, and interface definitions which a user or operator can employ to deploy the services of dataset processing environment 606, among other services.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. Physical or logical elements of communication interface system 607 can receive datasets from telemetry sources, transfer datasets and control information between one or more machine learning algorithms, and interface with a user to receive data selections and provide contextualized datasets, among other features.

User interface system 608 is optional and may include a keyboard, a mouse, a voice input device, a touch input device for receiving input from a user. Output devices such as a display, speakers, web interfaces, terminal interfaces, and other types of output devices may also be included in user interface system 608. User interface system 608 can provide output and receive input over a network interface, such as communication interface system 607. In network examples, user interface system 608 might packetize display or graphics data for remote display by a display system or computing system coupled over one or more network interfaces. Physical or logical elements of user interface system 608 can receive datasets or data selection information from users or other operators, and provide contextualized datasets or other information to users or other operators. User interface system 608 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface. In some examples, portions of API 626 are included in elements of user interface system 608.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof. In some examples, portions of API 626 are included in elements of user interface system 608.

Certain inventive aspects may be appreciated from the foregoing disclosure, of which the following are various examples.

EXAMPLE 1

A method of correlating data elements among telemetry datasets, the method comprising obtaining an indication of a data selection defining at least one data entry of interest among datasets that comprise data entries determined by one or more associated telemetry elements, and establishing a joined dataset based at least on contextually corresponding characteristics derived from the datasets. The method includes processing the joined dataset with a plurality of adaptive functions to correlate data entries of the joined dataset to the data selection, with each of the plurality of adaptive functions configured to produce an associated correlation dataset comprising data entries potentially related to the data selection. The method includes evaluating each associated correlation dataset to select an output dataset comprising contextual data entries related to the data selection.

EXAMPLE 2

The method of Example 1, wherein the contextually corresponding characteristics comprise a time correlation among the datasets, and further comprising establishing the joined dataset based at least on the time correlation among the datasets, the time correlation including a timeframe associated with the data selection.

EXAMPLE 3

The method of Examples 1-2, further comprising establishing the time correlation among the datasets by at least determining time properties associated with the data entries of the datasets, and forming the joined dataset by merging portions of the datasets having corresponding time properties.

EXAMPLE 4

The method of Examples 1-3, wherein the data entries of the datasets are not related by data key associations, and wherein the contextually corresponding characteristics are derived from at least properties of the datasets.

EXAMPLE 5

The method of Examples 1-4, further comprising receiving an indication of a first noted event with the data selection, the first noted event associated with at least a first dataset, and for each of the plurality of adaptive functions, determining potential events among the joined dataset that are evaluated by the associated adaptive function to correspond to a context of the first noted event.

EXAMPLE 6

The method of Examples 1-5, further comprising correlating the first noted event to a target issue associated with a monitored element among the one or more telemetry elements, and for each of the plurality of adaptive functions, identifying a pattern of operational events that indicate the target issue among the joined dataset.

EXAMPLE 7

The method of Examples 1-6, further comprising for each of the plurality of adaptive functions, processing the joined dataset with one or more machine learning algorithms to determine correlations of data entries in the joined dataset to the at least one data entry of interest and produce the associated correlation dataset.

EXAMPLE 8

The method of Examples 1-7, further comprising evaluating each associated correlation dataset to select the output dataset based at least on a ranking of performance indicators associated with the one or more machine learning algorithms having processed past datasets of a similar type as one or more of the datasets.

EXAMPLE 9

The method of Examples 1-8, further comprising selecting ones of the plurality of adaptive functions to process the joined dataset based on at least one selection factor comprising properties of data indicated by the data selection, properties of the data entries determined by the one or more associated telemetry elements, and indications of performance of the plurality of adaptive functions with regards to further datasets that share characteristics with the datasets.

EXAMPLE 10

An apparatus comprising one or more computer readable storage media, and program instructions stored on the one or more computer readable storage media. When executed by a processing system, the program instructions direct the processing system to at least obtain an indication of a data selection defining at least one data entry of interest among datasets that comprise data entries determined by one or more associated telemetry elements, establish a joined dataset based at least on contextually corresponding characteristics derived from the datasets, and process the joined dataset with a plurality of adaptive functions to correlate data entries of the joined dataset to the data selection, with each of the plurality of adaptive functions configured to produce an associated correlation dataset comprising data entries potentially related to the data selection. The program instructions further direct the processing system to evaluate each associated correlation dataset to select an output dataset comprising contextual data entries related to the data selection.

EXAMPLE 11

The apparatus of Example 10, wherein the contextually corresponding characteristics comprise a time correlation among the datasets, and comprising further program instructions, when executed by the processing system, direct the processing system to at least establish the joined dataset based at least on the time correlation among the datasets, the time correlation including a timeframe associated with the data selection.

EXAMPLE 12

The apparatus of Examples 10-11, comprising further program instructions, when executed by the processing system, direct the processing system to at least establishing the time correlation among the datasets by at least determining time properties associated with the data entries of the datasets, and forming the joined dataset by merging portions of the datasets having corresponding time properties.

EXAMPLE 13

The apparatus of Examples 10-12, wherein the data entries of the datasets are not related by data key associations, and wherein the contextually corresponding characteristics are derived from at least properties of the datasets.

EXAMPLE 14

The apparatus of Examples 10-13, comprising further program instructions, when executed by the processing system, direct the processing system to at least receive an indication of a first noted event with the data selection, the first noted event associated with at least a first dataset, and for each of the plurality of adaptive functions, determine potential events among the joined dataset that are evaluated by the associated adaptive function to correspond to a context of the first noted event.

EXAMPLE 15

The apparatus of Examples 10-14, comprising further program instructions, when executed by the processing system, direct the processing system to at least correlate the first noted event to a target issue associated with a monitored element among the one or more telemetry elements, and for each of the plurality of adaptive functions, identify a pattern of operational events that indicate the target issue among the joined dataset.

EXAMPLE 16

The apparatus of Examples 10-15, comprising further program instructions, when executed by the processing system, direct the processing system to at least, for each of the plurality of adaptive functions, process the joined dataset with one or more machine learning algorithms to determine correlations of data entries in the joined dataset to the at least one data entry of interest and produce the associated correlation dataset.

EXAMPLE 17

The apparatus of Examples 10-16, comprising further program instructions, when executed by the processing system, direct the processing system to at least evaluate each associated correlation dataset to select the output dataset based at least on a ranking of performance indicators associated with the one or more machine learning algorithms having processed past datasets of a similar type as one or more of the datasets.

EXAMPLE 18

The apparatus of Examples 10-17, comprising further program instructions, when executed by the processing system, direct the processing system to at least select ones of the plurality of adaptive functions to process the joined dataset based on at least one selection factor comprising properties of data indicated by the data selection, properties of the data entries determined by the one or more associated telemetry elements, and indications of performance of the plurality of adaptive functions with regards to further datasets that share characteristics with the datasets.

EXAMPLE 19

A method of operating a telemetry data processing system, the method comprising receiving an indication of event of interest that is included among datasets comprising operational events determined by one or more associated telemetry elements, and establishing a joined dataset from at least portions of the datasets that include a timeframe of the event of interest. The method includes processing the joined dataset with a plurality of machine learning algorithms to correlate events of the joined dataset to the event of interest, with each of the plurality of machine learning algorithms configured to produce an associated joined dataset comprising data entries potentially related to the event of interest, and evaluating each associated joined dataset to select an output dataset comprising contextual data entries accumulated from the datasets that are related to the event of interest.

EXAMPLE 20

The method of Example 19, further comprising evaluating each associated joined dataset to select the output dataset based at least on a ranking of performance indicators associated with the plurality of machine learning algorithms having processed past datasets of a similar type as one or more of the datasets.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of correlating data elements among telemetry datasets, the method comprising:
obtaining an indication of a data selection defining an error associated with a computer application, wherein the selection is made from datasets that comprise operational event data entries associated with the computer application determined by one or more associated telemetry elements;
establishing a joined dataset based at least on contextually corresponding characteristics derived from the datasets, wherein the contextually corresponding characteristics comprise at least:
a time of occurrence of a first operational event data entry for a first dataset of the datasets, and a time of occurrence of a second operational event data entry for a second dataset of the datasets, and
an inferred correlation between the first dataset and the second dataset, wherein the first dataset includes an identifier of an application that generated the first dataset that is not included in the second dataset, and wherein the inferred correlation is based on deducing that the identifier should also be associated with the second dataset by applying a machine learning model to the second dataset;
processing the joined dataset with a plurality of adaptive functions to correlate data entries of the joined dataset to the data selection, with each of the plurality of adaptive functions configured to produce an associated correlation dataset comprising data entries potentially related to the data selection; and
evaluating each associated correlation dataset to select an output dataset comprising contextual data entries related to the data selection.

2. The method of claim 1, wherein the contextually corresponding characteristics comprise a time correlation among the datasets, and further comprising:
establishing the joined dataset based at least on the time correlation among the datasets, the time correlation including a timeframe associated with the data selection.

3. The method of claim 2, further comprising:
establishing the time correlation among the datasets by at least determining time properties associated with the data entries of the datasets; and
forming the joined dataset by merging portions of the datasets having corresponding time properties.

4. The method of claim 1, wherein the data entries of the datasets are not related by data key associations, and wherein the contextually corresponding characteristics are derived from at least properties of the datasets.

5. The method of claim 1, further comprising:
receiving an indication of a first noted event with the data selection, the first noted event associated with at least a first dataset; and
for each of the plurality of adaptive functions, determining potential events among the joined dataset that are evaluated by the associated adaptive function to correspond to a context of the first noted event.

6. The method of claim 5, further comprising:
correlating the first noted event to a target issue associated with a monitored element among the one or more telemetry elements;
for each of the plurality of adaptive functions, identifying a pattern of operational events that indicate the target issue among the joined dataset.

7. The method of claim 1, further comprising:
for each of the plurality of adaptive functions, processing the joined dataset with one or more machine learning algorithms to determine correlations of data entries in the joined dataset to the error associated with the computer application and produce the associated correlation dataset.

8. The method of claim 7, further comprising:
evaluating each associated correlation dataset to select the output dataset based at least on a ranking of performance indicators associated with the one or more machine learning algorithms having processed past datasets of a similar type as one or more of the datasets.

9. The method of claim 1, further comprising:
selecting ones of the plurality of adaptive functions to process the joined dataset based on at least one selection factor comprising properties of data indicated by the data selection, properties of the data entries determined by the one or more associated telemetry elements, and indications of performance of the plurality of adaptive functions with regards to further datasets that share characteristics with the datasets.

10. An apparatus comprising:
one or more computer readable storage media;
program instructions stored on the one or more computer readable storage media that, when executed by a processing system, direct the processing system to at least:
obtain an indication of a data selection defining an error associated with a computer application, wherein the selection is made from datasets that comprise operational event data entries associated with the computer application determined by one or more associated telemetry elements;
establish a joined dataset based at least on contextually corresponding characteristics derived from the datasets, wherein the contextually corresponding characteristics comprise at least:
a time of occurrence of a first operational event data entry for a first dataset of the datasets,
a time of occurrence of a second operational event data entry for a second dataset of the datasets, and
an inferred correlation between the first dataset and the second dataset, wherein the first dataset includes an identifier of an application that generated the first dataset that is not included in the second dataset, and wherein the inferred correlation is based on deducing that the identifier should also be associated with the second dataset by applying a machine learning model to the second dataset;
process the joined dataset with a plurality of adaptive functions to correlate data entries of the joined dataset to the data selection, with each of the plurality of adaptive functions configured to produce an associated correlation dataset comprising data entries potentially related to the data selection; and
evaluate each associated correlation dataset to select an output dataset comprising contextual data entries related to the data selection.

11. The apparatus of claim 10, wherein the contextually corresponding characteristics comprise a time correlation among the datasets, and comprising further program instructions, when executed by the processing system, direct the processing system to at least:
establish the joined dataset based at least on the time correlation among the datasets, the time correlation including a timeframe associated with the data selection.

12. The apparatus of claim 11, comprising further program instructions, when executed by the processing system, direct the processing system to at least:
establishing the time correlation among the datasets by at least determining time properties associated with the data entries of the datasets; and
forming the joined dataset by merging portions of the datasets having corresponding time properties.

13. The apparatus of claim 10, wherein the data entries of the datasets are not related by data key associations, and wherein the contextually corresponding characteristics are derived from at least properties of the datasets.

14. The apparatus of claim 10, comprising further program instructions, when executed by the processing system, direct the processing system to at least:
receive an indication of a first noted event with the data selection, the first noted event associated with at least a first dataset; and
for each of the plurality of adaptive functions, determine potential events among the joined dataset that are evaluated by the associated adaptive function to correspond to a context of the first noted event.

15. The apparatus of claim 14, comprising further program instructions, when executed by the processing system, direct the processing system to at least:
correlate the first noted event to a target issue associated with a monitored element among the one or more telemetry elements;
for each of the plurality of adaptive functions, identify a pattern of operational events that indicate the target issue among the joined dataset.

16. The apparatus of claim 10, comprising further program instructions, when executed by the processing system, direct the processing system to at least:
for each of the plurality of adaptive functions, process the joined dataset with one or more machine learning algorithms to determine correlations of data entries in the joined dataset to the error associated with the computer application and produce the associated correlation dataset.

17. The apparatus of claim 16, comprising further program instructions, when executed by the processing system, direct the processing system to at least:
evaluate each associated correlation dataset to select the output dataset based at least on a ranking of performance indicators associated with the one or more machine learning algorithms having processed past datasets of a similar type as one or more of the datasets.

18. The apparatus of claim 10, comprising further program instructions, when executed by the processing system, direct the processing system to at least:
select ones of the plurality of adaptive functions to process the joined dataset based on at least one selection factor comprising properties of data indicated by the data selection, properties of the data entries determined by the one or more associated telemetry elements, and indications of performance of the plurality of adaptive functions with regards to further datasets that share characteristics with the datasets.

19. A method of operating a telemetry data processing system, the method comprising:
receiving an indication of an error associated with a computer application that is included among datasets comprising operational events associated with the computer application determined by one or more associated telemetry elements;
establishing a joined dataset from at least portions of the datasets that include a timeframe of the error associated with the computer application, wherein the timeframe is determined from times of occurrence of a first operational event data entry for a first dataset of the datasets, and a time of occurrence of a second operational event data entry for a second dataset of the datasets;

inferring a correlation between the first dataset and the second dataset, wherein the first dataset includes an identifier of an application that generated the first dataset that is not included in the second dataset, and wherein the inferred correlation is based on deducing that the identifier should also be associated with the second dataset by applying a machine learning model to the second dataset;

processing the joined dataset with a plurality of machine learning algorithms to correlate events of the joined dataset to the error associated with the computer application, with each of the plurality of machine learning algorithms configured to produce an associated dataset comprising data entries potentially related to the error associated with the computer application; and evaluating each associated dataset to select an output dataset comprising contextual data entries accumulated from the datasets that are related to the error associated with the computer application.

20. The method of claim 19, further comprising:

evaluating each associated dataset to select the output dataset based at least on a ranking of performance indicators associated with the plurality of machine learning algorithms having processed past datasets of a similar type as one or more of the datasets.

* * * * *